April 24, 1951 — O. E. DROEGE ET AL — 2,550,189
BULK EGG BREAKING AND SEPARATING
Filed Feb. 12, 1948 — 2 Sheets-Sheet 1

INVENTORS
Orville E. Droege
Cedric Hale
Paul Schauert
BY R. G. Story
ATTORNEY

INVENTORS
Orville E. Droege
Cedric Hale
Paul Schauert
BY R. H. Story
ATTORNEY

Patented Apr. 24, 1951

2,550,189

UNITED STATES PATENT OFFICE 2,550,189

BULK EGG BREAKING AND SEPARATING

Orville E. Droege, Glenellyn, and Cedric Hale and Paul Schauert, Chicago, Ill., assignors to Swift & Company, Chicago, Ill., a corporation of Illinois Application February 12, 1948, Serial No. 7,856

7 Claims. (Cl. 99—113)

This invention relates to the treatment of eggs, and more particularly is concerned with a method for the bulk-breaking of eggs and the separation of the egg meats from the shells.

It is an object of this invention to provide an improved method for separating egg meats from the shells in quantity lots.

Another object of this invention is to provide a method for conditioning fresh eggs for centrifugal separation in mass production lots.

A further object resides in heat-stabilizing the egg meats prior to centrifugal separation from their shells.

Still another object of this invention is to provide an improved method of separating the egg meats from their shells prior to freezing.

Other objects will appear in the specification below.

Figure 1:
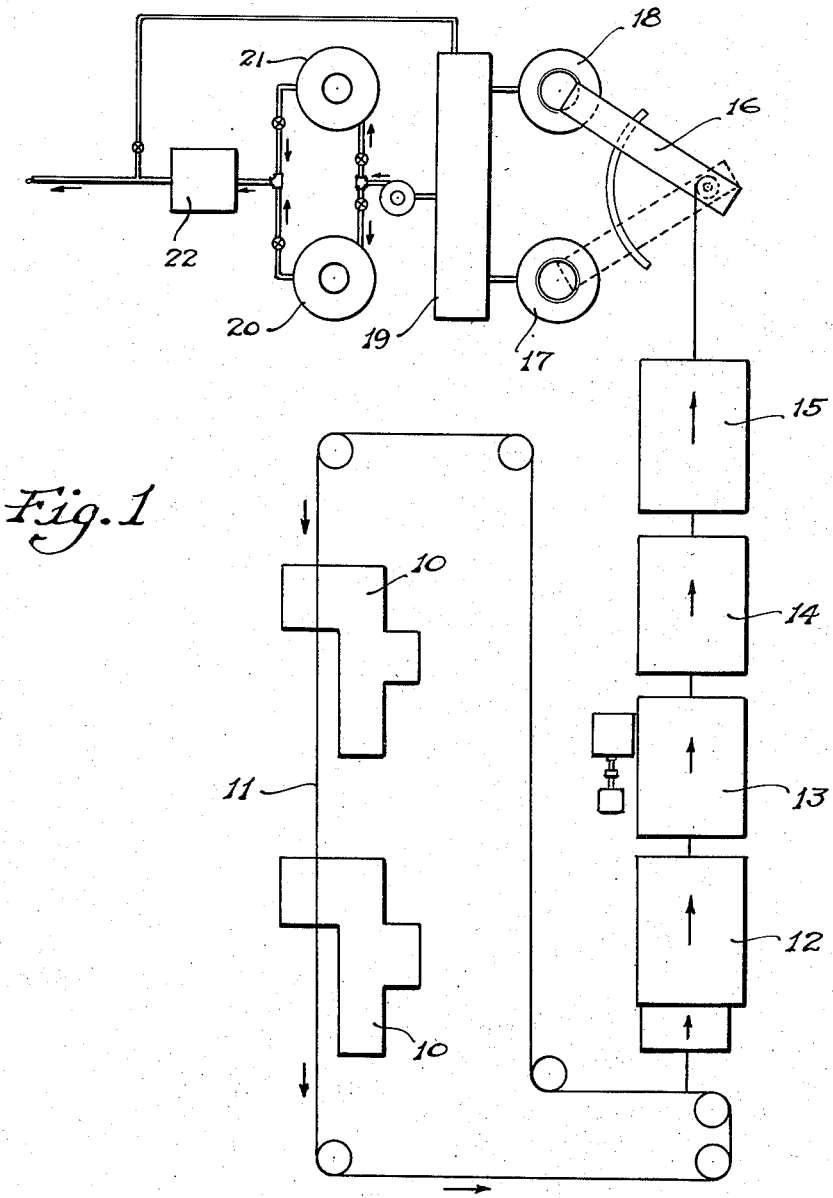
Figure 1 is a diagrammatic layout of an apparatus adapted to perform the method of this invention.

In the past certain trades have demanded eggs in quantity lots and have requested the distributors of the eggs to break the egg meats out of the shells, freeze the meats and deliver the frozen meats to them from time to time as required. Further, due to the seasonal fluctuations inherent in the production and distribution of eggs, it is necessary to store the eggs collected during peak production periods for use in the off production seasons, and for this reason, too, it has been the practice to break out at least a portion of the eggs so handled whereby they may be frozen and stored in quantity lots.

In the past these shelled egg meats have been separated from the shells by hand, the eggs being broken, inspected, and the egg meats drained from the shells by gravity as the workers handle each individual egg. The eggs are graded, and sometimes the whole egg meats are collected and frozen together, or they may be separated as between the whites and yolks before freezing. It is the usual practice to first candle each individual egg; then, if the egg passes this inspection, to break the egg out of its shell and drop it into a suitable cup. The eggs are then graded by smell, color, or any other desired characteristic, and are moved forward for further processing.

It has long been apparent that a considerable saving in handling costs could be realized by the elimination of the great amount of manual labor which is required to break out each individual egg, but to date no practicable or suitable substitution for the manual operation has been provided, and it is the purpose of this invention to provide such a method for breaking eggs in bulk and separating the whole egg meats from the shells. The present invention has been devised to not only greatly speed up the separation of the egg meats from the shells by mechanical means, with a consequent saving in labor, but also to accomplish more perfect separation whereby an increased yield of the egg meat substance can be realized from each case of eggs processed in accordance with the present teaching. In the practice of this invention, the separation of the egg meats from the shells and the increase in yield is produced along with an improvement in the ultimate quality of the final product as compared with any frozen egg product heretofore available.

Many attempts have been made to devise an improved method and means for separating egg meats from their shells, but these prior art developments have been either too complicated mechanically or the final product has been found to be of inferior quality. For these reasons, none of these prior art machines has been found useful for commercial operations.

Machines have been proposed in the past to filter out the shell particles and also to effect separation of the egg meats from the shells by centrifugal force. These machines have failed of their purpose, however, because of mechanical difficulties and failure to eliminate or control the bacteria present on the surface of the shells of the eggs and within the egg meats.

The present invention goes forward from this type of egg-separating art and, coupled with an improved method for conditioning the eggs prior to the bulk-breaking step, makes it possible to bulk-break eggs and centrifugally separate the meats from the shells. The method contemplates the use of heat to stabilize the egg meats and kill bacteria on the surface of the eggs prior to the delivery of the eggs to the centrifugal separating device. Eggs which have been so treated to destroy the bacteria may be successfully separated from their shells in bulk to provide egg meats which may be frozen and which have a quality even better than that of the frozen egg meats produced by the hand-breaking operation.

In the performance of this invention, and referring more particularly to the drawings, the conventional crates filled with eggs are delivered into egg-candling stations 10, where the individual eggs are inspected by candlers and loaded into suitable basket carriers in single layers of about 36 eggs each. At the candling station, fertile eggs which have germinated are eliminated, as are also checked and cracked eggs and otherwise defective product.

The baskets loaded with the selected eggs are placed on an endless conveyor 11, which carries the baskets around to the inlet end of a washing and stabilizing machine, where an operator or a suitable switching mechanism transfers the loaded baskets to a conveyor mechanism for moving the loaded baskets through the washing and stabilizing means.

The washing and stabilizing mechanism found most useful in the performance of this invention is shown in the copending application of William J. Patterson, Serial No. 729,607, filed February 19, 1947. In this machine the eggs are carried in their baskets through a suitable soaking section 12 of the washer, which loosens the surface dirt and warms the eggs uniformly to a temperature of approximately 130° F. The eggs are then carried in their baskets to spray chamber 13, where a washing fluid under pressure is sprayed against the surfaces of the eggs to complete the removal of surface dirt, and which sprays continue the warming or tempering of the eggs. Usually a detergent is placed in solution in the washing fluid, and in this case the eggs are passed through a warm rinsing bath to remove the washing solution. Thereafter the baskets loaded with eggs are carried to a heating bath in chamber 14, where the eggs are immersed in a liquid maintained at a temperature of 136° F., and the eggs are permitted to remain in the bath for a period of about 7 minutes. When the eggs are tempered and then treated at this temperature for the specified length of time, substantially all the bacteria on the surface of the shells and within the egg meats are destroyed without coagulating, to any appreciable extent, any of the egg meats.

It will be noted that in passing through the washer, although the eggs may have different temperatures as they enter the machine, the initial tempering bath is operative to heat the eggs up to a uniform temperature of approximately 130° F. as the surfaces of their shells are being washed, and thereafter the eggs are stabilized by heat upon being subjected to a temperature of 136° F. for a period of 7 minutes. Tempering prior to running the eggs into the stabilizing bath results in a most uniform stabilization of the eggs, wherein the eggs are heated at a temperature sufficiently high to kill any bacteria present; yet, this is done without cooking the egg meats to any noticeable degree. As the eggs have a uniform temperature coming into the stabilizing bath, each egg is heated in the same manner, and a uniform conditioning of the egg meats results. This is a critical and important phase of the present invention. The above described stabilizing method is shown in the copending application of Hale, et al., Serial No. 572,427, filed January 11, 1945, now abandoned.

As the baskets of eggs pass from the stabilizing bath, they are delivered into a drying chamber 15, where the surface liquids are subjected to several blasts of air whereby all moisture is blown and evaporated from the surfaces of the shells, and then the baskets pass to a suitable unloading device, or preferably to an operator stationed at the outlet end of the washing and stabilizing machine.

The operator removes the baskets from the conveyor as it leaves the drying chamber and inspects the baskets of eggs. Because of the cooling effect produced in the dryer, the eggs, at this point, have a temperature of approximately 105° F. to 110 F. If any bad eggs have escaped the inspection of the candlers, the volatile substances within such an egg meat are given off and may be detected even though the shell of the particular egg is unbroken so that the operator can eliminate any baskets containing one or more defective eggs. This is particularly true with respect to the type of spoiled egg known as the straw or hay egg.

The operator, after inspecting the eggs, releases them from the baskets so that they fall into an infeed chute or driven conveyor means 16, from the outlet end of which the eggs drop into one or the other of a pair of centrifuges 17 and 18. As soon as the eggs hit the whirling basket of the centrifuge, their shells are immediately broken.

The apparatus here shown for delivering the eggs to the centrifuge and for separating the meats from the shells has been especially designed to prevent the incorporation of air in the egg meat, and to prevent, in so far as possible, undue agitation of the liquid egg material in order to minimize the production of foam. A further aspect of this invention resides in feeding the whole eggs into the centrifugal separator at a relatively even rate so that there is a substantially continuous flow of egg liquid through the centrifuge and into the surge tank. This is preferably accomplished with an infeed conveyor to the centrifuge, such as that shown in Figure 4.

With this form of conveyor apparatus, a continuously moving, endless conveyor is provided which may be formed of a plurality or individual laterally disposed flight elements 60 connected at each side to a roller belt means 61. The belts 61 are driven at a constant rate of speed whereby the flights are carried past the end of the stabilizing mechanism to receive eggs to be delivered into the centrifuge, and the conveyor speed is such that the eggs may be unloaded onto the conveyor so as to keep the flights 60 substantially full at all times. The flights 60 are spaced apart from each other and are each provided with six egg-holding pockets having about the same spacing as that between the rows of eggs loaded in the baskets used to carry the eggs through the washing and stabilizing means.

Figure 4:
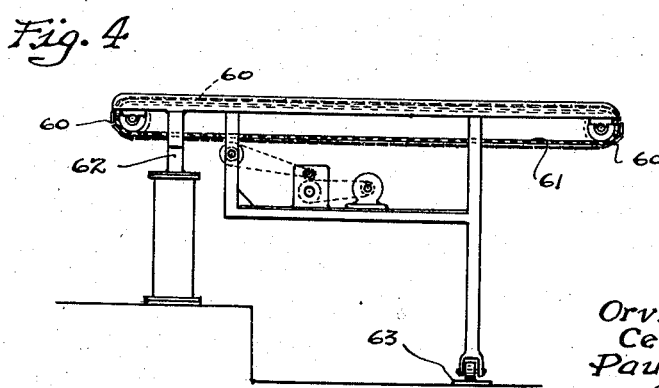
Figure 4 is a side view of the conveyor shown in Figure 3.

In using the conveyor shown in Figure 4, the operator may quickly unload a basket of eggs onto the conveyor, and the 36 eggs in the basket will quickly find their places in the individual pockets of the several flights 60 disposed below the basket. The eggs are then carried forwardly with the conveyor and are dropped, six at a time, into the funnel 40 of the centrifuge as each flight passes around the other end of its run. In this way a controlled, even feed of eggs into the centrifuge is provided whereby the egg meats can be most expeditiously separated from the shells.

The conveyor may be pivotally mounted at the inlet end of the conveyor on a support 62 so that it may be moved to feed either one or the other of the centrifuges 17 or 18. The outlet end of the conveyor may be carried on a rolling support adapted to ride on track 63, which is concentric with the pivotal mounting.

When the eggs are received into either one or the other of the centrifugal separators and the shells are broken, the egg meats are released and flow outwardly through the perforations in the basket of the centrifuge. The shell particles are retained in the basket, and it is important that the egg meats be removed from the outer chamber of the centrifuge after passing through the basket with the least possible agitation. The eggs are delivered into the centrifuge and the meats passed through it in a matter of seconds, and the separated egg meats are delivered from the centrifuge through a shell settling chamber 50 (see Figure 2) into a surge tank 19. The centrifuges 17 and 18 are operated in alternate sequence so that a continuous flow of eggs can be handled in practicing this invention.

Figure 2:
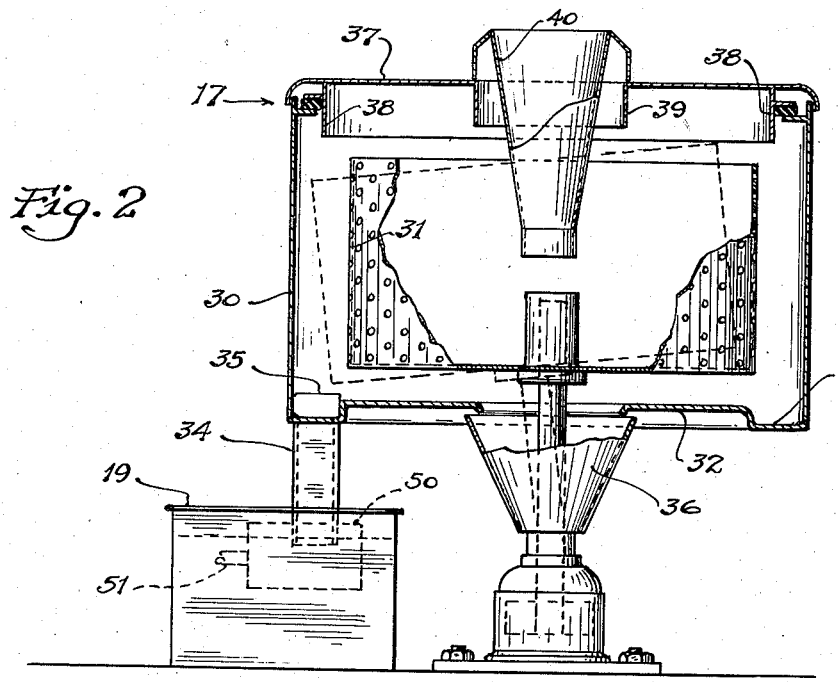
Figure 2 is a cross-sectional view, partly broken away, of a centrifugal separator adapted to serve our purpose, together with its outlet passage and connection with a surge tank.

The preferred form of the centrifuges 17 and 18 is described and claimed in the copending application of William J. Patterson for Egg Separator, Serial No. 7,850, filed February 12, 1948, and is shown in Figure 2 of the drawings of this application. In these views, the casing 30 of the centrifuge is designed to contain a rotating basket 31 having perforated side walls and an open top. The basket is rotated at a sufficient speed to quickly separate the liquid egg meats from the shattered pieces of the egg shells, and the meats pass through the perforations while the shells are retained in the basket. The basket 31 may be operated until the weight of the shells building up in the basket throws it off balance too greatly such that substantial vibrations are established. When this takes place, the basket is thrown from its true centered position to vibrate in the manner as represented by the dotted line position. The outer wall 30 of the casing extends vertically above the plane of upper edge of the basket so that any liquid egg material thrown out from the basket in any of its postions as indicated in Figure 2 will fall upon the smooth surface of the wall to flow downwardly to the outlet passage.

The floor 32 of the centrifuge has a depressed flow channel portion 33 surrounding its periphery. This channel is provided to receive the egg meat material as it flows down the wall 30 of the centrifuge. A suitable outlet passage 34 connects into the bottom of channel 33, and the egg meat fluid flows around in the channel until it falls into the outlet passage 34. A baffle 35 may be provided at the downstream side of the opening into the outlet passage to prevent liquid material from flowing backwardly into the outlet passage in a manner such that air would be trapped in with the liquid. It has been found that a sufficient motion is imparted to the liquid egg material by the rotating basket 31 to cause it to flow around through the channel 33 whereby the liquid is carried to the outlet passage.

A stationary conical sealing means 36 is provided at the bottom of the centrifuge around the drive member for the perforated basket to prevent air from flowing into the inside of the bowl of the centrifuge.

The top of the centrifuge is provided with a cover 37, which is sealed against the wall 30 with a suitable gasket, and the cover is provided with a pair of circular baffle rings 38 and 39. The baffle 38 is positioned with respect to basket 31 to prevent any of the egg meat material being thrown directly against the seal between the cover and the wall 30, and the baffle 39 is provided in order to catch any shell particles which might ricochet from the basket 31 when the eggs are initially dropped into it. The baffle 39 prevents such flying shell particles from falling outside of the basket where they might become entrained in the egg meat liquid. A suitable conical infeed means 40 is provided in the center of the cover 37 to direct the eggs being fed to the machine into basket 31. The funnel 40 is designed to be as small as possible without unduly restricting the flow of eggs into the machine in order to minimize the admission of air into the apparatus through the cover.

When the above-described type of centrifuge is used, the outlet passage 34 delivers the egg meat liquid directly into the surge tank 19 through a shell settling chamber 50. Chamber 50 functions to slow down the flow of the egg meat material so as to permit any solid shell particles to settle to the floor, and the egg meat liquid flows from the chamber 50 through an outlet opening 51 into the main portion of the surge tank 19. Also the chamber 50 is disposed with relation to the end of outlet passage 34 and surge tank 19 such that the end of the passage is continuously below the surface of the body of liquid egg meats contained therein during operation whereby a liquid seal is provided to prevent air from flowing into the machine through the outlet passage.

The egg meats flowing into the surge tank are delivered therefrom by means of a pump into one of the pair of clarifiers 20 and 21. The clarifiers are very high-speed centrifugal separating devices such as the Sharples Super centrifuges, and are operative to remove any minute shell particles and chalazas which may still be entrained in the egg meats. The clarifiers are operated in alternate sequence, the same as the centrifuges, in order that a continuous flow of egg meat liquid may be maintained. The clarified egg meats are delivered from the surge tank at a temperature of about 98°–100° F. into the clarifiers.

After the egg meats have been clarified as fully explained above, the liquid is delivered to the cooler 22, which preferably is like that shown in the patent to Clarence Vogt, No. 1,783,864, granted December 2, 1930. Such a cooler is especially designed for handling egg material in a manner to prevent the whipping of air into the egg liquid such as would produce an undue amount of foam. In passing through the cooler, the egg meats are chilled to a temperature just above their freezing point and are delivered from the cooler into suitable containers in which they may be immediately frozen. The egg meats freeze at a temperature of about 29° F. to 30° F., and preferably they are partially frozen in the cooling means such that they may be delivered into the bulk containers in the form of a very liquid slush.

As above explained, eggs may be passed through the above-described device in the performance of the method of this invention so that the eggs are washed to remove surface dirt and bacteria, and thereafter the shell eggs are uniformly heat-stabilized. The elimination of bacteria on the surfaces of the shells and in the egg meats is necessary in order to make it possible to successfully break eggs in a bulk process while maintaining a high quality in the ultimate product. Although it has been known that eggs may be stabilized by a heat-treating process as above described, it is critical to the successful performance of the present invention concerning the separation of the meats from the shells that the stabilization be performed in a manner whereby the bacteria are killed and debris eliminated from the surface of the shells without cooking the egg meats to any noticeable degree. If the egg meat should become coagulated, it will not readily pass through the basket of the centrifuge and thus cannot be efficiently separated from the egg shell. Uniform stabilization to produce the desired sterilization without cooking of the egg is therefore essential. The tempering step coupled with heat stabilization at 136° F. for about 7 minutes accomplishes a proper application of heat sufficient to destroy bacteria without cooking.

In practicing the invention here disclosed, it is possible to separate egg meats from their shells in quantity lots at a much faster rate than has ever been possible heretofore. This faster production in the bulk-breaking of eggs may be accomplished while simultaneously improving the quality of the resulting product since all of the bad eggs are eliminated and substantially all bacteria in the meats and on the shells are killed prior to the separation of the egg meats from the shells.

For example, a comparison has been made of the bacteria count found in a given batch of eggs, part of which were broken by the prior art hand-breaking procedure and part of which were broken in a bulk-breaking means similar to that of this invention. The results of these tests are tabulated below.

| Sample | Bacteria Count Hand-Breaking | Bacteria Count Bulk-Breaking |
| --- | --- | --- |
| 1 | 8,500,000 | 16,000 |
| 2 | 7,600,000 | 35,000 |
| 3 | 6,100,000 | 21,000 |
| 4 | 23,000,000 | 17,000 |
| 5 | 8,200,000 | 23,000 |
| 6 | 13,000,000 | 13,000 |
| 7 | 1,400,000 | 49,000 |
| 8 | 5,400,000 | 23,000 |

It has been found that the egg meats can not only be separated from their shells much more rapidly in following this teaching, but also a somewhat greater yield of product is derived because of the more effective separation accomplished in the operation of the centrifugal separators. The total weight of egg meats in a crate of eggs will run around 40 pounds per crate. With the herein-disclosed bulk-breaking process, an increased yield of about 1.5 pounds per crate has been realized, i. e., an increase of about 4.0 per cent.

Figure 3:
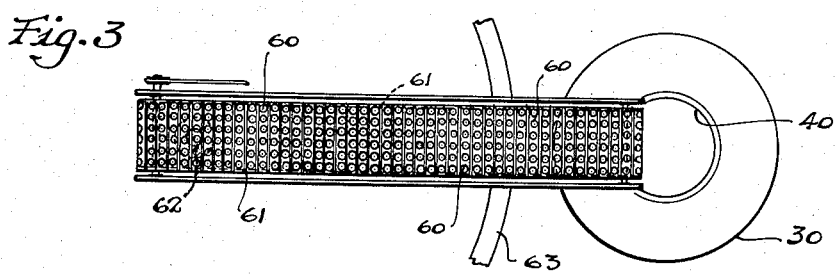
Figure 3 is a detail plan view showing an infeed conveyor for the centrifuges.

The machinery used at the egg candling station 10 preferably takes the form of that shown in any of the patents granted to William C. Wyland, Numbers 1,728,462, September 17, 1929; 1,864,034, June 21, 1932; and 2,135,778, November 8, 1938. It is to be understood, however, that any other apparatus adapted to handle eggs in bulk lots to effect the candling thereof could be used for this purpose.

Where fully automatic operations are desired, it is readily apparent that a single conveyor can be used to transport the loaded egg-carrying devices from the egg candling station, through the egg washing and stabilizing machine, and over the infeed to the centrifuges. When the loaded egg-carrying baskets arrive at this point, a tripping arrangement can be provided to unload each of the baskets as by tipping them to spill the eggs into the centrifuges directly or by tripping the unloading lever, where a basket may be used such as is shown in the aforementioned Patterson application, Serial No. 729,607. In this last instance, the eggs may drop from the basket into a feed chute, or they can be placed on the conveyor shown in Figures 3 and 4. The operator can, of course, supervise the operation of the automatic unloading means and remove any batches of hot eggs that are noticeably smelly.

It is also apparent that other forms of separator devices may be used to remove the egg meats from the shell particles; for example, a screen filter. The important consideration, as fully described heretofore, resides in cleaning the surface of the shells and stabilizing the egg meats prior to breaking the shells, and then bulk-breaking the eggs in such a machine as will quickly remove the meats from the shells.

While the above description covers the preferred manner of practicing this invention, it is probable that many modifications thereof will occur to those skilled in the art, which will fall within the scope of the following claims.

We claim:

1. The method of breaking shell eggs in bulk and separating the egg meats from the shells, comprising heat stabilizing all of the shell eggs at a temperature of about 136° F. without appreciably cooking the egg meats and sterilizing the surface of their shells, and then simultaneously breaking a number of the shell eggs and centrifugally separating the meats from the shell particles.

2. The method of breaking shell eggs in bulk and separating the egg meats from the shells, comprising heat-stabilizing all of the shell eggs in batches by first heat tempering the eggs to produce a uniform temperature in all of the eggs, and then heating them at 136° F. for a period of about 7 minutes, eliminating smelly batches of the eggs, and then simultaneously breaking a number of the shell eggs and centrifugally separating the meats from the shell particles.

3. The method of breaking shell eggs in bulk and separating the egg meats from the shells, comprising heat stabilizing all of the shell eggs by heating them to a temperature of about 136° F. without appreciably cooking the egg meats and sterilizing the surface of their shells, and then breaking the shells of a number of the eggs and centrifugally separating the meats from the commingled shell particles.

4. In a process of breaking shell eggs in bulk and separating the egg meats from the shells by centrifuging, the improvement comprising: subjecting the shell eggs from which the surface debris has been removed to a heat treatment at a temperature of about 136° F. to simultaneously sterilize the shells of said eggs and destroy microorganisms in the egg meats without coagulating an appreciable amount of the egg meats, and thereafter simultaneously breaking a number of the said shell eggs and centrifugally separating the meats from the shells to produce a liquid egg product having a relatively low bacteria content and good keeping qualities.

5. In a process of breaking shell eggs in bulk and separating the egg meats from the shells by centrifuging, the improvement comprising: simultaneously sterilizing the surface of the shell eggs prior to breaking and destroying microorganisms in the egg meats without coagulating an appreciable amount of the egg meats, and thereafter breaking a number of the said shell eggs and centrifugally separating the meats from the shells to produce a liquid egg product having a relatively low bacteria content and good keeping qualities.

6. The method of breaking shell eggs in bulk and separating the egg meats from the shells, comprising washing and heat-stabilizing the eggs at a temperature of about 136° F. to kill bacteria present within and on the egg shells, and then simultaneously breaking a number of shell eggs and centrifugally separating the meats from the shell particles.

7. In a process of breaking shell eggs in bulk and separating the egg meats from the shells by centrifuging the improvement, comprising simultaneously sterilizing the surface of a number of the shell eggs prior to breaking and destroying microorganisms in the egg meats by applying heat to the said shell eggs without coagulating an appreciable amount of egg meats, and thereafter breaking a number of the said shell eggs and centrifugally separating the egg meats from the shells producing liquid egg products having a relatively low bacteria content and good keeping qualities.

ORVILLE E. DROEGE.
CEDRIC HALE.
PAUL SCHAUERT.

REFERENCES CITED

The following references are of record in the file of this patent:

UNITED STATES PATENTS

| Number | Name | Date |
| --- | --- | --- |
| 1,862,508 | Howard | June 7, 1932 |
| 1,924,990 | Harris et al. | Aug. 29, 1933 |
| 2,115,729 | Lomax | May 3, 1938 |
| 2,346,682 | Harris | Apr. 18, 1944 |
| 2,423,233 | Funk | July 1, 1947 |

FOREIGN PATENTS

| Number | Country | Date |
| --- | --- | --- |
| 325,045 | Great Britain | Feb. 13, 1930 |

OTHER REFERENCES

"The U. S. Egg and Poultry Magazine," July, 1943, article entitled "Heat Treating Shell Eggs," by Barott and McNally, pages 320 to 322.